United States Patent
Herzog et al.

(10) Patent No.: US 6,824,849 B2
(45) Date of Patent: Nov. 30, 2004

(54) LASER-CUTTABLE MULTI-LAYER SHEET MATERIAL

(75) Inventors: Silke Herzog, Meerbusch (DE); Peter Weber, Solingen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/333,704

(22) PCT Filed: Aug. 6, 2001

(86) PCT No.: PCT/US01/24653
§ 371 (c)(1),
(2), (4) Date: Jan. 23, 2003

(87) PCT Pub. No.: WO02/12411
PCT Pub. Date: Feb. 14, 2002

(65) Prior Publication Data
US 2003/0207062 A1 Nov. 6, 2003

(30) Foreign Application Priority Data
Aug. 7, 2000 (EP) ............................................ 00116953

(51) Int. Cl.⁷ ............................................ B32B 33/00
(52) U.S. Cl. ....................... 428/40.1; 283/81; 428/41.3; 428/41.5; 428/343; 428/355; 428/423.1; 524/730; 525/124; 525/125
(58) Field of Search ............................... 428/40.1, 41.3, 428/41.5, 343, 355, 423.1; 283/81; 524/730; 525/124, 125

(56) References Cited

U.S. PATENT DOCUMENTS

| | | |
|---|---|---|
| 2,884,126 A | 4/1959 | Ulrich |
| RE24,906 E | 12/1960 | Ulrich |
| 3,843,390 A | 10/1974 | Hudson et al. |
| 4,772,512 A | 9/1988 | Nagafuchi |
| 5,593,785 A | 1/1997 | Mayo et al. |
| 5,626,966 A | 5/1997 | Kulper et al. |
| 5,688,573 A | 11/1997 | Goeb et al. |
| 5,780,559 A | 7/1998 | Humbert et al. |
| 5,843,547 A | 12/1998 | Kulper et al. |
| 5,977,256 A | 11/1999 | Huybrechts et al. |

FOREIGN PATENT DOCUMENTS

| | | |
|---|---|---|
| CA | 2155233 | 2/1997 |
| DE | 81 30 861 U | 1/1983 |
| DE | 41 41 914 A | 6/1993 |
| EP | 0 359 532 B1 | 3/1990 |
| EP | 0 359 532 A | 3/1990 |
| EP | 617711 | * 10/1994 |
| JP | 2[1990]120042 | 5/1990 |
| JP | 11-296089 A | 10/1999 |
| WO | WO 98/00456 | 1/1998 |

* cited by examiner

*Primary Examiner*—Nasser Ahmad

(57) ABSTRACT

The invention relates to the use of a halogen-free multi-layer sheet material comprising (i) a base film of a polymer comprising the reaction product of a precursor mixture comprising at least one hydroxy-functional resin and an aminoplast cross-linking agent; (ii) an adhesive layer; and (iii) optionally, a release liner, as a label or a label stock or in the manufacture of a laser cuttable and/or laser markable article. The invention also relates to the use of a halogen-free film of a polymer comprising the reaction product of a precursor mixture comprising at least one hydroxy-functional resin and an aminoplast cross-linking agent in a laser cuttable and/or laser-markable article.

5 Claims, No Drawings

LASER-CUTTABLE MULTI-LAYER SHEET MATERIAL

FIELD OF THE INVENTION

The invention is related to the use of multi-layer sheet materials containing a polymeric base film inter alia as labels and label stocks, novel multi-layer sheet materials and a method for preparing such multi-layer sheet materials. The invention is also related to the use of a polymeric film in laser-cuttable and/or laser-markable articles.

BACKGROUND OF THE INVENTION

Various markable materials in the form of self-adhesive sheets or films are known, which may be marked, for example, by means of a laser beam. Such markable materials are predominately used in the commercial sector as nameplates, rating plates, information plates, identification plates, inventory labels, barcode data carriers, animal tags and the like. Laser-markable materials have also found application in optically readable, e.g. authenticatable, articles, such as identity cards, teller cards and the like.

For commercial purposes it is desirable that the marked materials, e.g. laser-marked labels, are resistant to the effects of aging, chemicals, high temperatures and natural weathering. The specific properties required are linked to the final application and the demands of the user. For certain uses, for example identification plates of automobiles, it is desirable that the laser-markable materials, such as labels, are tamper resistant. Under the term tamper resistance is to be understood that in its final application the laser-markable material, e.g. label, cannot be removed without damage.

Laser-markable adhesive labels containing PVC are mostly used. Such labels typically contain a base film or layer with an adhesive layer on one surface of the base film and a top film or layer on the opposite surface of base film. The base and top films are pigmented in contrasting colors. To form an image, the top film is ablated and thus partially removed by means of the laser beam, exposing the base film of a different color. Upon this type of marking corrosive gases may be formed, inter alia due to the vaporization of the top film, which contains a halogen-containing material.

The German utility model G 81 30 861 discloses a multi-layer label consisting of two layers of lacquer. These layers of lacquer consist of e.g. polyurethane cross-linked by radiation. The preferred lacquer consists of a mixture of hexanediol bisacrylate and a commercially available polyurethane acrylate which is composed of a long-chain polyester diol, an aliphatic diisocyanate and terminal acrylic moieties.

Laser-markable labels of this kind are obtainable under the trade name TESA 6930 (Company Beiersdorf AG, Hamburg, Germany). By the process of radiation cross-linking the possibility of adjusting mechanical properties is limited. Consequently the labels show little flexibility and do not conform to irregular surfaces.

Also commercially available are laser-markable adhesive labels of the company W. H. Brady Company, Milwaukee, U.S.A. These labels are predominately made of biaxially orientated polyesters. These labels are not tamper-resistant.

These adhesive labels consist of a top film and a base film, both of which have been dyed in different colors.

In Chemical Abstracts 111 (18) 153979c (JP-A-90 120042) there have been described heat-resistant self adhesive (pressure-sensitive) films which are used as laser-markable labels. 3,3',4,4'-biphenyltetracarboxylic acid anhydride 3,3'-thiodianiline polyamino acid is mixed with carbon black dried and treated at 180° C. for 60 minutes and then at 250° C. for six hours. One surface of the resulting layer was coated with a solution containing titanium dioxide, and the layer was also treated at an elevated temperature. The reverse surface of the layer was provided with a silicone-based pressure-sensitive adhesive.

Nagafushi, in U.S. Pat. No. 4,772,512 discloses a composite film for bar code labels comprising first and second heat resisting non-water absorbing synthetic resin films. On the first film of the composite film, bar codes can be reproduced by means of a high speed drying process electrostatic copier. As the first and second heat resisting, non-water absorbing synthetic resin films in the composite film polyester films, polyimido films, polycarbonate films, cellulose ester films and polyamide films were used.

U.S. Pat. No. 5,688,573 discloses a halogen-free acrylic urethane sheet material comprising a polymer comprising components A, B and C wherein component A comprises a copolymer of (i) a monoester of acrylic or methacrylic acid and an aliphatic diol having 2 to 8 carbon atoms and (ii) a ester of acrylic or methacrylic acid and an aliphatic alcohol having 1 to 8 carbon atoms, and optionally a vinyl aromatic monomer as well as N-vinylpyrrolidone or N-vinylcaprolactame, said component A having a Tg of 30° C. to 100° C., component B comprising an aliphatic polyester diol with a weight-average molecular weight less than 20,000 and component C comprising a polyfunctional isocyanate or blocked polyfunctional isocyanate. The acrylic urethane sheet material is radiation, e.g. laser, markable.

CA 2,155,233 discloses an authenticatable laminated article comprising an inner, laser beam markable core layer, two protective layers, an optical interference layer and an adhesive layer, The core layer may be any material known in art which can be discolored by a laser beam.

EP 0 732 678 and EP 0 688 678 disclose respectively a multi-layer or single-layer self adhesive label containing a base layer, i.e. film, made of plastic, which contains an additive which exhibits a color change on irradiation with a laser. Preferred plastics for the base layer are e.g. polyester, poly(meth)acrylate, polycarbonate and polyolefins, unsaturated polyester, epoxy-, polyester- and urethanacrylate, in particular those of G 81 30 816.

A laser-markable label stock in which the laser marking or imaging is based on a color change is commercially available under Color Laser Film black/white (Company Schreiner Etiketten und Selbstklebetechnik Gmbh & Co, Oberschleißheim bei München, Germany). Said label stock contains a single polyester base film with an adhesive layer on one surface of the film.

SUMMARY OF THE INVENTION

In the production of such laser-markable labels, the label form is typically cut from a sheet material, a film or a label stock using the laser beam, which also serves to create the image on the label. This provides greater flexibility in the production process and avoids the costly establishing of die-cutting equipment next to the laser beam equipment. However one of the limiting factors in the rate of such manufacture of labels is the speed at which the label form can be cut from the sheet material or film or label stock. Also in the production of laser-marked articles, where an image is produced by laser cutting, e.g. etching, engraving or ablation, the rate at which the corresponding film or layer can be cut by the laser can be a time limiting factor for the laser marking.

Thus, it would be advantageous to develop and/or apply sheet materials comprising a polymeric backing film which show rapid laser cuttability and at the same time exhibit properties expected for use of such materials in the commercial sector.

In particular, it is desirable to provide sheet materials for various purposes, e.g. for use as laser-markable adhesive labels or label stocks, as well as polymeric films for use in laser-markable and/or laser-cuttable articles, which show rapid laser cutting times and/or excellent mechanical properties and resistance to severe environmental stress like heat, solvents and weathering and do not generate halogen-containing corrosive gases upon laser cutting.

It has been surprisingly found that polymeric film products made of aminoplast cross-linked hydroxy-functional resin exhibit advantageous properties, and in particular, excellent laser cutting performance.

Accordingly, one aspect of the present invention is the use of a halogen-free multi-layer sheet material comprising
  (i) a base film of a polymer comprising the reaction product of a precursor mixture comprising at least one hydroxy-functional resin and an aminoplast cross-linking agent;
  (ii) an adhesive layer; and
  (iii) optionally, a release liner, as a label or label stock.

A second aspect of the present invention is the use of a halogen-free multi-layer sheet material as described above in the manufacture of a laser cuttable and/or laser markable article.

A third aspect of the present invention is the use of a halogen-free film of a polymer comprising the reaction product of a precursor mixture comprising at least one hydroxy-functional resin and an aminoplast cross-linking agent in a laser-cuttable and/or laser-markable article.

A further aspect of the present invention is the provision of a halogen-free multi-layer sheet material comprising
  (i) a base film of a polymer comprising the reaction product of a precursor mixture comprising a first hydroxy-functional resin, a second hydroxy-functional resin and an aminoplast cross-linking agent;
  (ii) an adhesive layer; and
  (iii) optionally, a release liner,
wherein the first hydroxy-functional resin is a hydroxy-functional acrylic resin and the second hydroxy-functional resin is selected from the group consisting of hydroxy-functional polyester resins, hydroxy-functional polyether resins, hydroxy-functional epoxy resins, cellulose derivatives and phenol formaldehyde resins.

Coating systems comprising aminoplast cross-linked hydroxy-functional resins are known from U.S. Pat. Nos. 5,977,256, 5,593,785, EP 0 909 288, U.S. Pat. Nos. 3,843,390 and 5,780,559. Said prior art documents relate, however, exclusively to coating technology and are silent with respect to self-adhesive sheets or films as well as laser-cuttable and/or markable materials, sheets, films, labels or label stocks.

EP 0 359 532 discloses a protective overlay film comprising a protective layer made from a mixture of at least one hydroxy-functional acrylic polyol and at least one polyfunctional curing agent and an adhesive layer on inner surface of the protective layer. This document however is silent with respect to labels or label stocks as well as laser-cuttable and/or markable materials, sheets, films, labels or label stocks.

The multi-layer sheet materials according to the invention as well as the use of the polymeric films and multi-layer sheet materials according to the invention exhibit advantageous mechanical properties and/or allow a more rapid laser cutting and thus manufacture of articles, such as labels or precut-label stocks, which are form-cut by a laser. Also for articles, which are marked by laser etching or ablation, the production of the marking or image may require less time.

Advantageously, the properties of the polymeric film can be adjusted within definite ranges to meet specific user-demands and field of applications, especially in regard to excellent mechanical properties and resistance to severe environmental stress like heat, solvents and weathering as required for commercial use. Also certain preferred sheet materials or films of the invention provide sheet materials or films which exhibit properties suitable for tamper resistant labels or the like.

The multi-layer sheet materials and films in accordance with the invention can be laser cut or marked without the formation of halogen-containing noxious gases and thus exhibit in this regard environmental compatibility.

The present invention also provides a method of preparing a multi-layer sheet material, the method comprising the following steps:
  a) providing a precursor mixture comprising a first hydroxy-functional resin, a second hydroxy-functional resin and an aminoplast cross-linking agent, wherein the first hydroxy-functional resin is a hydroxy-functional acrylic resin and the second hydroxy-functional resin is selected from the group consisting of hydroxy-functional polyester resins, hydroxy-functional polyether resins, hydroxy-functional epoxy resins, cellulose derivatives and phenol formaldehyde resins;
  b) providing a film of the mixture and curing the mixture to form a base film; and
  c) applying an adhesive layer onto the base film and, optionally, covering the adhesive layer with a release liner to form the sheet material.

DETAILED DESCRIPTION OF THE INVENTION

The term "laser-cuttable articles" as used above and below include any article, which is cut, etched or ablated by laser during its manufacture, processing or intended commercial use. Laser-markable articles include any article, which is intended to be marked or is marked by laser, such that an image is formed.

One aspect of the invention is the use of polymeric films comprising the reaction product of a precursor mixture comprising at least one hydroxy-functional resin and an aminoplast crosslinking agent in laser-markable and/or laser-cuttable articles. Such use includes, for example, the use of such polymeric films in laser-markable labels, label stocks and optically readable articles, such as laser-markable identity cards, teller cards and the like. The use of the polymeric films according to the invention has been found to be particularly advantageous in laser-markable labels and label stocks.

Another aspect of the invention is the use of multi-layer sheet materials as labels or label stocks; said multi-layer sheet materials comprising a polymeric film comprising the reaction product of a precursor mixture comprising at least one hydroxy-functional resin and an aminoplast crosslinking agent as a base film, an adhesive layer and, optionally, a release liner. Due to their advantageous laser-cutting properties, said multi-layer sheet materials are particularly suitable for use as laser-markable and/or laser cuttable labels or label stock, more particular laser-markable labels and label stocks. They are also suitable for the manufacture of optically readable articles, such as laser-markable identity cards, teller cards and the like.

A hydroxy-functional resin includes any polymer having at least two hydroxy-functional groups. A hydroxy-functional resin may be selected from the group consisting of hydroxy-functional acrylic resins, hydroxy-functional polyester resins, hydroxy-functional polyether resins, hydroxy-functional epoxy resins, cellulose derivatives and phenol formaldehyde resins. Preferably, the hydroxy-functional resin is a hydroxy-functional acrylic, polyester, polyether or an epoxy resin, more preferably a hydroxy-functional acrylic or polyester resin, most preferably a hydroxy-functional acrylic resin.

Hydroxy-functional resin or resins may be present in the precursor mixture in amounts of from 70 to 90% by weight, preferably 75 to 90% by weight; the percentages of weight being based on total weight of resin solids in the precursor mixture. Under the term "total weight of resin solids" is to be understood the total weight of resin solids comprising hydroxy-functional resin and aminoplast cross-linking agent.

In preferred embodiments of the use of the polymeric films and multi-layer sheet materials, the precursor mixture of the film polymer may further comprise a second hydroxy-functional resin. Preferably, the first hydroxy-functional resin is a hydroxy-functional acrylic resin and the second hydroxy-functional resin is selected from the group consisting of hydroxy-functional polyester resins, hydroxy-functional polyether resins, hydroxy-functional epoxy resins, cellulose derivatives and phenol formaldehyde resins. As second hydroxy-functional resin, hydroxy-functional polyester, polyether and epoxy resins are preferred. Hydroxy-functional polyester and polyether resins are more preferred, while hydroxy-functional polyester resins are most preferred as the second hydroxy-functional resin.

Multi-layer sheet materials provided in accordance with the invention comprise a base film of a polymer comprising the reaction product of a precursor mixture comprising a first hydroxy-functional resin, a second hydroxy-functional resin and an aminoplast cross-linking agent; an adhesive layer; and optionally, a release liner. The first hydroxy-functional resin is a hydroxy-functional acrylic resin and the second hydroxy-functional resin is selected from the group consisting of hydroxy-functional polyester resins, hydroxy-functional polyether resins, hydroxy-functional epoxy resins, cellulose derivatives and phenol formaldehyde resins. As second hydroxy-functional resin, hydroxy-functional polyester, polyether and epoxy resins are preferred. Hydroxy-functional polyester and polyether resins are more preferred, while hydroxy-functional polyester resins are most preferred as the second hydroxy-functional resin.

When hydroxy-functional acrylic resin is applied in combination with a second hydroxy-functional resin, hydroxy-functional acrylic resin may be present in the precursor mixture in amounts of from 20 to 80% by weight, preferably 30 to 70% by weight; the percentages of weight being based on total weight of resin solids in the precursor mixture. The second hydroxy-functional resin, in particular hydroxy-functional polyester resin, may be present in the precursor mixture in amounts of from 5 to 60% by weight, preferably 10 to 50% by weight; the percentages of weight being based on total weight of resin solids in the precursor mixture.

Hydroxy-functional acrylic resins may include any acrylic or methacrylic polymer having at least two hydroxy-functional groups. Hydroxy-functional acrylic resins can be for example obtained through the polymerization of a suitable ester of acrylic or methacrylic acid containing a hydroxy-functional group or through copolymerization of such an ester with other esters of acrylic or methacrylic acid which may or may not contain a hydroxy-functional group. Examples of suitable esters of acrylic or methacrylic acid containing a hydroxy-functional group include 2-hydroxyethyl acrylate, 2-hydroxy-1-methylethyl acrylate, 2-hydroxypropyl acrylate, 3-hydroxypropyl acrylate, 2-hydroxybutyl acrylate, 4-hydroxybutyl acrylate, 2-hydroxyethyl methacrylate, 2-hydroxy-1-methylethyl methacrylate, 2-hydroxypropyl methacrylate, 3-hydroxypropyl methacrylate, 2-hydroxybutyl methacrylate, 4-hydroxybutyl methacrylate and similar compounds. Examples of suitable non-hydroxy-functional esters of acrylic or methacrylic acid for purposes of copolymerization include alkyl acrylates or methacrylates, such as methyl acrylate, ethyl acrylate, propyl acrylate, isopropyl acrylate, butyl acrylate, isobutyl acrylate, hexyl acrylate, 2-ethylacrylate, cyclohexyl acrylate, methyl methacrylate, ethyl methacrylate, propyl methacrylate, isopropyl methacrylate, butyl methacrylate, isobutyl methacrylate, hexyl methacrylate, 2-ethylmethacrylate, cyclohexyl methacrylate and similar compounds. Hydroxy-functional acrylic resins may also include hydroxy-functional vinyl-acrylic copolymers.

Hydroxy-functional acrylic resins preferably have a weight-average molecular weight ($M_w$) less than about 10,000, more preferably in range of 500 to 7000 and most preferably in the range of 2000 to 5500 as measured by gel permeation chromatography (GPC). The polydispersity ($M_w/M_n$ (number-average molecular weight)) is preferably less than 2.0, more preferably less than 1.9.

Hydroxy-functional polyester resins may include any polyester having at least two hydroxy-functional groups. The hydroxy-functional polyester resin may be a saturated or unsaturated polyester resin, an alkyd resin, a polycarbonate or a polylactone, preferably a saturated polyester resin or a polylactone, more preferably a saturated polyester resin.

Saturated hydroxy-functional polyester resins, also oil-free alkyd resins, which include branched or non-branched aliphatic polyester diols or polyols, may be produced by polycondensation of polyols with poly-functional, saturated carboxylic acids or acid anhydrides. Unsaturated hydroxy-functional polyester resins may be based on polycondensation products of mixtures of poly-functional carboxylic acids or acid anhydrides, in which one compound is unsaturated, and diols or polyols. Alkyd resins may be based on polycondensation products of mixtures containing poly-functional, saturated or unsaturated carboxylic acids or acid anhydrides, diols or polyols and saturated or unsaturated fatty acids or oils, such as triglycerides. Polycarbonate may be prepared by the reaction of diols with phosgene. Polylactones, e.g. polycaprolactones, can be produced by the polyaddition of caprolactone to diols.

Suitable diols and polyols include ethylene glycol, 1,2-propane diol, diethylene glycol, 2-methyl 2-ethyl 1,3 propane diol, 1,4-butane diol, 1,6-hexane diol, neopentyl glycol, trimethyl pentane diol, 1,4-cyclohexane dimethanol, tricylcodecane dimethanol, trimethylol propane, glycerol, hydroxypivalic acid neopentyl glycol ester, pentaerythlitol, dipentaerythritol, hydrogenated bisphenol A, bisphenol A-bis-hydroxyethylether, caprolactonediol and similar compounds. Suitable saturated carboxylic acids include isophthalic acid, terephthalic acid, hexahydroterephthalic acid, 5-tert-butylisophthalic acid, adipic acid, azelaic acid, sebacic acid, glutaric acid, chlorendic acid and similar compounds, while suitable saturated acid anhydrides include phthalic anhydride, hexahydroplithalic anhydride, tetrahydrophthalic anhydride, trimellitic anhydride, pyromellitic anhydride and similar compounds. Suitable unsaturated acid components include maleic acid, fumaric acid and their anydrides and Diels-Alder adducts made from maleic anhydride and cyclopentadiene.

Hydroxy-functional polyether resins may include any polyether having at least two hydroxy-functional groups. Hydroxy-functional polyether resins include polyalkylene glycols, such as polyethylene glycols, polypropylene glycols, polytetrametlhylene glycols (tetrahydrofuran polymers) and ethylene oxide-modified polypropylene glycols.

Hydroxy-functional polyether resins may be produced through polymerization of propylene oxide and/or ethylene oxide with hydroxy-containing compounds, such as water, glycerin, ethylene glycol, diethylene glycol, triethylene glycol, propylene glycol, dipropylene glycol, pentaerythritol, dipentaerythritol, sucrose, sorbitol and similar compounds. Tetrahydrofuran polymers can be produced through the cationic polymerisation of tetrahydrofuran.

Hydroxy-functional epoxy resins, e.g. epoxy resins with secondary hydroxy groups, include any epoxy resin having at least two hydroxy-functional groups. Suitable epoxy resins may be prepared through the condensation of epoxide compounds having a reactive group neighboring the epoxy group, such as epichlorohydrin, with a poly-functional alcohol or phenol, for example bisphenol A. Other suitable poly-functional alcohols or phenols include the diols and polyols mentioned above for polyesters.

Cellulose derivatives include cellulose esters, such as cellulose nitrate, cellulose acetate, cellulose acetate butyrate, cellulose acetate proprionate, and cellulose ethers, such as methyl cellulose, hydroxyethylcellulose, hydroxypropylcellulose and carboxymethylcellulose.

Phenol formaldehyde resins include resins prepared through the reaction of formaldehyde, often in the form of formalin or paraformaldehyde, with a phenol. Suitable phenols include phenol itself; cresols; xylenols; bisphenol A; bisphenol F; alkylphenols, like p-tert-butylphenol, p-tert-amylphenol, p-tert-isooctylphenol, p-tert-diisobutylphenol, o-isononylphenol, p-isononylphenol, o-cyclohexylphenol, p-cyclohexylphenol and isothymol; arylphenols, e.g. p-phenylphenol; diphenols; cardonol and cardol.

Hydroxy-functional polyester resins, polyether resin, epoxy resins, cellulose derivatives and phenol formaldehyde resins, in particular hydroxy-functional polyester resins, preferably have a weight-average molecular weight less than about 7000, more preferably in range of 400 to 5000 and most preferably in the range of 750 to 3000 as measured by GPC. The polydispersity ($M_w/M_n$) is preferably less than 2.0, more preferably less than 1.85, most preferably less than 1.7.

The degree of cross-linking and the flexibility of the polymeric film product can be in part adjusted by the initial hydroxy content of the hydroxy-functional resin applied in the precursor mixture. Rigid, hard polymeric film products can be obtained by applying hydroxy-functional resin with a high hydroxy content, for example around 10%. Flexible polymeric film products, which can advantageously conform to irregular surfaces and at the same time possess good handlability, can be obtained by using a hydroxy-functional resin having a hydroxy content less than 8.5%, more preferably in the range of about 3 to about 8.0.

The aminoplast cross-linking agent used in the present invention may be selected from the group consisting of triazine resins, urea-formaldehyde resins, cyanamide resins, glycoluril resins and mixtures thereof. Preferably, the aminoplast cross-linking agent is a triazine resin. More preferably, the cross-linking agent is a triazine resin selected from the group consisting of melamine resins, guanamine resins and mixtures thereof. Guanamine resins include benzoguanamine resins. Most preferred are melamine resins as the cross-linking agent. Suitable melamine resins include melamie-formaldehyde resins, alkylated melamine-formaldehyde resins and mixtures thereof. Alkylated melamine-formaldehyde resins include methylated and/or butylated melamine-formaldehyde resins having a high degree of alkylation. Alkylated melamine-formaldehyde resins such as methoxymethyl butoxymethyl melamine resin, methoxymethyl isobutoxymethyl melamine resin, hexamethoxy methyl melamine resin, methoxy ethoxy melamine-formaldehyde resin and mixtures thereof, have been found to be particularly suitable as cross-linking agent. Methoxymethyl butoxymethyl melamine resin has been found most suitable for the aminoplast cross-linking agent.

Aminoplast cross-linking agent or agents may be present in the precursor mixture in amounts of from 10 to 30% by weight, preferably in amounts from 10 to 25% by weight; the percentages of weight being based on total weight of resin solids in the precursor mixture.

The precursor mixture of the film polymer may further comprise a pigment, a solvent, a wetting additive and/or a catalyst.

Pigments such an inorganic or organic pigments and/or dyes can be used for coloring the polymeric films. For generating a black color, carbon black based pigment paste is suitable as it is sold under the trade name ISOVERSAL LM 00677 (ISL, Kuerten, Germany). As a white colored pigment, powdered titanium dioxide can be used (Kronos 2310, Kronos International, Leverkusen, Germany). Also aluminum particles of 5 $\mu$m length in a solvent (STAPA-Off-Set 30000, Eckhart-Werke, Fürth, Germany) can be used. Other pigments are C.I. pigment red 178/71155 (Palogen rot L3910 HD, BASF, Ludwigshafen, Germany), C.I. pigment yellow 110 (Irgazin gelb 3RLT-N, Ciba-Geigy, Marienberg, Germany), C.I. pigment blue (1511 and Heliogen blau K 6911D, BASF Ludwigshafen, Germany).

Suitable pigments also include additives, which change color upon irradiation with laser, such as copper hydroxide phosphate or pearl luster pigment as available under the trademark Iriodin (Merck KGaA, Darmstadt, Germany) and additives, which cause a visible mark to be formed upon irradiation, such as kaolin, mica, mixtures of mica and titanium dioxide and wollastonite or titanium dioxide-coated mica particles. The latter is available under the trademark AFFLAIR (E. Merck Corp., Hawthorne, N.Y.) or MEARLIN (The Mearl Corp., New York, N.Y.).

Pigment may be present in amounts from 0.5 to 40% by weight based on total weight of precursor mixture.

Wetting agents support the casting performance of the film and the formation of a uniform and smooth surface without surface defects and/or pinholes. Suitable wetting agents include acrylate-based polymers, for example, an acrylate-based wetting agent under the trademark DISPARLON L 1980 from Kusomoto, Japan. The wetting agent can be present in amounts from 0.1 to 2.0% by weight based on total weight of precursor mixture.

Optionally, a solvent may also be added to the precursor mixture of the film polymer. An example for a suitable solvent is a dibasic ester comprising a mixture of dimethyl glutarate (50 to 70% by weight), dimethyl succinate (19 to 30% by weight) and dimethyl adipate (10 to 25 by weight) as available from Sigma-Aldrich, Steinheim, Germany. The solvent can be present in amounts from 1 to 35% by weight based on total weight of precursor mixture.

As catalysts there may be used those which in general promote cross-linking reactions with aminoplasts and hydroxy-functional groups, such as acid catalysts, including alkyl acid phosphates, phosphoric acid, maleic acid and anhydride, fumaric acid, chloromaleic acid and anhydride, alkyl acid phthalates, monoalkyl succinates and maleates. Catalysts which have been found to be particularly suitable are compounds such as the sulfonic acids and derivatives thereof including, for example p-toluene sulfonic acid, methyl-p-sulfonic acid. Catalyst may be present in amounts from 0.1 to 1.0% by weight based on total weight of precursor mixture.

The skilled person understands that for adjusting characteristic properties of the polymeric films and for economical reasons fillers, e.g. mica, calcium carbonate kaolin, may be added to the polymer precursor mixture.

The polymeric films used in laser-markable and/or laser-cuttable articles or as base films in the sheet materials according to the invention may be marked by laser irradiation. For example, said films can be partially ablated by laser in order to create an image. The image itself can be rendered easily visible by printing ink on the surface of the film. Alternatively, a laser marking or imaging may achieved by a color change in the film upon laser irradiation.

Multi-layer sheet materials provided in accordance to the invention as well as those used as labels or label stocks in accordance to the invention may further comprise a top film. The top film may be polymeric and, for example, may be of polyurethanes or polycarbonates. Alternatively, the top film may be made of a polymer comprising the reaction product of a precursor mixture comprising at least one hydroxy-functional resin and an aminoplast cross-linking agent. Such a precursor mixture for the top film polymer may also further comprise a second hydroxy-functional resin. The hydroxy-functional resins and aminoplast cross-linking agents used for a top film may be the same as those used for the base film polymer. The precursor mixture for the top film polymer may further comprise a pigment, a solvent, a wetting additive and/or catalyst as well as filler. These components may be the same as those used for the base film polymer.

The top film may marked by laser, for example through partial laser ablation or a color change upon laser irradiation. Sheet materials comprising a top film can be used for laser marking applications where it is desirable to have an image in two colors. For example, the base and top films may be pigmented with contrasting colors.

The polymeric films used in laser-markable and/or laser-cuttable articles or as base films in the multi-layer sheet materials used as labels or label stocks or in the manufacture of laser cuttable and/or laser markable articles can be prepared by the following process:

The hydroxy-functional resin is mixed with any optional components, such as a second hydroxy-functional resin, pigments, solvents, wetting agents. The aminoplast cross-linking agent and optionally catalyst are then added to form the precursor mixture. The cross-linking agent and the optional catalyst are preferably added to the mixture containing hydroxy-functional resin directly before the coating operations so that premature cross-linking reaction does not occur.

Preferably, the polymer precursor mixture has a Brookfield viscosity in the range of about 500 to about 4,500 mPa.s and a non-volatiles content in the range of about 50 to 99%. More preferred is a Brookfield viscosity in the range of about 750 to about 3,250 mPa.s and a non-volatiles content in the range of about 75 and 96%, and most preferred is a Brookfield viscosity in the range of about 900 to about 2,000 mPa.s and a non-volatiles content in the range of about 80 and 92%.

A layer of the precursor mixture is cast from organic solvent onto a removable support. The term removable support means an intermediate carrier. The removable support must have release properties and can be used also for surface modifying of the film, which is cast onto the removable support. The releasing properties are essential for easy and complete removal of the film. The removable support should not be removed before the films arranged on the support are self-supporting during further processing.

Casting from organic solution can be performed in a variety of ways. The solution may be laid down by means of screen printing, spraying, reverse rotogravure or more traditional coating methods such as life coating. Preferably the precursor mixture is arranged on the removable support by screen-printing or knife coating depending on the desired thickness of the layer.

The layer of precursor mixture is then cured, preferably by subjecting the layer to a series of heat treatments with increasing temperatures, for example starting at 23° C. and finishing at about 200° C.

The multi-layer sheet materials according to the invention are prepared is the same manner, with the exception that the precursor mixture is formed by first mixing a hydroxy-functional acrylic resin with a second hydroxy-functional resin and any optional components, and then adding aminoplast cross-linking agent and optionally catalyst.

The base film preferably has a thickness, after curing, of about 35 to about 200 $\mu$m, more preferably about 50 to about 170 $\mu$m and most preferably about 90 to about 130 $\mu$m.

Polymeric films having a tensile strength at break of about 1300 to about 3500 N/cm$^2$, more preferably about 1400 to about 3000 N/cm$^2$, even more preferably about 1450 to about 2700 N/cm$^2$, can be produced. Such films or sheet materials containing such a film as the base film are particularly advantageous for use in or as tamper resistant laser-markable and/or laser-cuttable articles, such as tamper-resistant labels, label stocks or optically readable articles.

After curing, the removable support can, if desired, be removed from the film to provide a self-supporting film. Under the term self-supporting is to be understood that the film has sufficient internal strength to be handled alone. The self-supporting film thus prepared can be further processed, as desired and known in the art, to provide a laser-markable and/or laser cuttable article.

To provide a multi-layer sheet material, the film may then be provided with a self-adhesive layer. This may be achieved by laminating the film with an adhesive layer, optionally covered by a release liner, to form the multi-layer sheet-material.

Alternatively, it is possible to leave the film on the removable support after curing and then apply the adhesive layer onto the film and, optionally, cover the adhesive layer with a release liner. Subsequently, the removable support can be removed from the film to provide the multi-layer sheet material. The adhesive layer may be applied onto the film by casting from organic solution or aqueous dispersion or by such techniques as hot melt coating.

To promote adhesion between the film and the adhesive layer, the film can be treated before the adhesive is applied. This treatment can be the application of a chemical primer or preferably corona discharge treatment.

For making the adhesive layer it is preferred to use pressure sensitive adhesives or heat-activatable adhesives. These may comprise polyacrylates, polyesters, polyolefins, polyamides, polyurethanes, silicone polymers, polybutadiene and copolymers, polyisoprenes and copolymers, natural and synthetic rubber as well as hydrogenated derivatives thereof with and without resins, fillers and cross-linking agents.

Polyacrylates have also proven to be useful, particularly those which have been modified for use on a variety of surfaces have very different surface energies, such as steel/polyethylene. Useful alkyl acrylates (i.e. acrylic acid alkyl ester monomers) for the preparation of polyacrylates include linear or branched monofunctional unsaturated acrylates or methacrylates of non-tertiary alkyl alcohols, the alkyl groups of which have from 4 to 14 and, in particular, from 4 to 12 carbon atoms. Examples of these lower alkyl acrylates include but are not limited to, n-butyl acrylate, isobutyl acrylate, hexyl acrylate, 2-ethylhexyl acrylate, isooctyl acrylate, n-octyl acrylate, n-octyl methacrylate, 2-methylbutyl acrylate, isononyl acrylate, n-nonyl acrylate, isoamylacrylate, n-decyl acrylate, isodecyl acrylate, isodecyl methacrylate, isobornyl acrylate, 4-methyl-2-pentyl acrylate and dodecyl acrylate.

Particularly preferred are acrylate based pressure-sensitive adhesive materials such as copolymers of isooctyl acrylate and acrylic acid like those disclosed in U.S. Pat. No. 2,884,126 (U.S. Pat. No. Re: 24,906) which is incorporated herein by reference. The adhesive layer can have a thickness of 10 to 100 $\mu$m, preferably 20 to 60 $\mu$m.

The pressure-sensitive adhesives which are particularly preferred are tackified or non-tackified isooctyl acrylate and acrylic acid copolymers. The copolymers are preferably employed in amounts ranging from 50 to 70% and preferably in an amount of about 60% by weight. As the tackifying resin there is preferably used Foral 85 (company Hercules), a hydrogenated rosin or its glycerol or pentaerythritol esters in amounts of preferably 30 to 50% and particularly preferred of about 40% by weight. In the mixture of adhesive, typically antioxidants in amounts of about 1% and cross-linkers such as for example aziridine compounds are added.

The adhesive layer can be protected by a release liner.

The release liner is preferably adhesive-repellant and more specifically comprises paper or film which has been coated or modified with compounds of low surface energy relative to the adhesive applied. Organ silicone compounds, fluoropolymers, polyurethanes and polyolefins can serve this purpose. The release liner can also be a polymeric sheet produced from polyethylene, polypropylene, PVC, polyesters with or without the addition of adhesive-repellant compounds. The release liner can have a thickness of 25 to 250 $\mu$m, preferably 80 to 120 $\mu$m.

A method of preparing of a sheet material further comprising a top film is similar to the method described above, however with the following exceptions:

before step a) the following steps are performed, comprising:
1) providing a precursor mixture for a top film;
2) providing a layer of the mixture and curing the mixture to form the top film;

and in step b) the layer of the mixture for the base film is provided onto the top film.

For example, if the precursor mixture for the top film, in accordance to a preferred embodiment of the sheet material, comprises hydroxy-functional resin, an aminoplast crosslinking agent and optional components, such as a second hydroxy-functional resin, pigments, solvents, wetting agents and/or catalysts, said precursor mixture can be prepared in a similar manner as that described for the precursor mixture for the base film.

The precursor mixture for the top film preferably has a Brookfield viscosity in the range of about 50 to about 400 mPa.s and a non-volatiles content in the range of about 40 to about 75 percent, more preferably a Brookfield viscosity in the range of about 50 to about 275 mPa.s and a non-volatiles content in the range of about 40 to about 65 percent.

The top film can be prepared by casting the precursor mixture for the top film from an organic solvent onto a removable support to provide a layer and then curing said layer in a manner similar to that described above for the base film.

The top film has preferably a thickness of about 2 to about 20 $\mu$m, more preferably about 5 to about 15 $\mu$m, most preferably about 7 to about 12 $\mu$m.

Once the top film has been prepared, the base film can be produced by the process described above, with the exception that the precursor mixture for the base film is now casted onto the top film, rather than onto the removable support. A self-adhesive layer can then be applied to the base film and optionally covered with a releaser liner as described above. Subsequently the removable support can be removed from the top film to provide a multi-layer sheet material according to a preferred embodiment of the invention.

The preparative procedures as described above are only exemplary and restrict by no means the scope of the present invention.

The invention is further illustrated by the following non-limiting examples.

Test Methods

Laser Cutting Speed

Multi-layer sheet materials supported on a release liner were cut with a Nd-YAG laser available from Baasel (now Rofin Sinar GmbH), Starnberg, Germany as Model SMU65. The wavelength of the laser light employed was 1.064 $\mu$m. The optics comprised a focussed lens (160 mm). The measurements were made in two differing modes: one where the full laser beam was employed and one where the laser beam was first passed through a 1.8 mm mode blend.

The laser beam was focused onto the multi-layer sheet material at such a depth that the film and adhesive layers were cut, but not the release liner. A rectangle, 1.2 cm by 0.8 cm, of the multi-layer sheet material approximating the size of a conventional label was cut in each case. The maximum speed with which the test sheet material could be cut completely and reproducibly was recorded in mm/sec.

Initial Adhesion

Samples of multi-layer sheet material having a width of 2.54 cm and a length of ca. 20 cm were adhered to a substrate using a 2 kg roller (2 passes) and allowed to dwell for a time of 30 minute. Thereafter, 90° peel adhesion was measured at a peel speed of 200 mm/min using a Zwick tensile tester (Zwick 1446, 100 Newton-head, from Zwick GmbH & Co., Ulm, Germany). Three samples were evaluated and then the results were averaged. Substrates evaluated were aluminum, polyethylene, polypropylene and acrylonitrile butadiene resin (ABS). Results were recorded in N/cm.

Tamper Resistance/Destructability

Determination of tamper resistance of the multi-layer sheet material was conducted after each chemical resistance/ immersion test and after the humidity resistance, thermal cycling and aging at 80° C. tests described below. Attempts were made to remove the sheet from the panel in a peeling fashion. If the sheet could be removed intact without damage, it was deemed "non-destructible" (or fail) and not tamper resistant. When the sample was found to be "non-destructible" the 90° peel adhesion was determined as described above. Sheet materials that stretched out of shape or broke apart upon removal were deemed "destructible" (or pass) and tamper resistant.

Tensile and Elongation

Tensile and elongation at break measurements were made on multi-layer sheet materials (base film plus adhesive layer) or self-supporting films according to DIN 53455. E-modulus was also recorded. Ten samples were measured and the results averaged.

Chemical Resistance

Sample preparation: A sample of multi-layer sheet material having the dimensions of 2.54 cm×20 cm was adhered to an aluminum plate, which had been cleaned with methyl ethyl ketone (MEK) and then a 50/50 wt/wt mixture of isopropanol and water. A 2 kg rubber-coated roller (2 passes) was used to roll the label onto the aluminum plate. The sheet/Al plate laminate was equilibrated in a climate-controlled room at 23° C. and a relative humidity of 50% for 24 hrs before testing.

Resistance of the sheet materials to various chemical environments was tested:

A. Oil Immersion According to ASTM Oil 2

A sample of multi-layer sheet material was adhered to an aluminum plate as described above under sample preparation. The aluminum plate bearing the sheet material was then immersed in oil #2 for 24 hrs at 70° C. After the immersion period, the sheet material was evaluated visually for separation from the plate.

B. Diesel Fuel Immersion

The gasoline immersion test was repeated with the exception that the adhered multi-layer sheet material was immersed in diesel fuel for 30 minutes at 23° C.

C. Water Immersion

A sample of multi-layer sheet material was adhered to an aluminum plate as described above and then immersed in distilled water 1 hour at 50° C.

D. Immersion in 1% Caustic Soda

A sample of multi-layer sheet material was adhered to a 5 mm thick polyethylene sheet by the method described above and immersed for 30 minutes at 23° C. in 1% by weight NaOH solution. The adhered sheet was evaluated visually.

E. Immersion in 5% Sulfuric Acid

A sample of multi-layer sheet material was adhered to 5 mm thick polyethylene sheet as described above and immersed in 5% by weight sulfuric acid solution for 30 minutes at 23° C. Visual appearance was evaluated.

F. Immersion in Toluene

A sample of multi-layer sheet material was adhered to an aluminum plate as described above. The adhered sheet material was then immersed in toluene for 15 minutes at 23° C.

Humidity Resistance DIN 50017

A sample of multi-layer sheet material was adhered to an aluminum plate as described above. The panel was placed in a controlled humidity chamber for 168 hours (1 week) at 38° C. and 100% relative humidity. The samples were observed visually and any changes in appearance were recorded.

Abrasion Resistance

Atlas AATCC Crockmeter Test Method 165–1988 was performed using a Crockmeter test. The test arm of the Crockmeter device was covered with dry cheese cloth and passed across the surface to be tested 100 times.

Shrinkage

A strip of multi-layer sheet material having a width of 2.54 cm and a length of ca. 20 cm was adhered to a cleaned aluminum plate as described above for the chemical resistance tests. The construction was allowed to equilibrate at 23° C. and a relative humidity of 50% for 24 hours. Samples were then subjected to either high temperature (24 hours at 100° C. in a forced air oven) or low temperature conditions (24 hrs at −25° C. in a freezer). The length and width of the adhered sheet material were measured both before and after the tests and then compared. Shrinkage was expressed in percent.

Thermal Cycling

One thermal cycle comprised 1 hr at −40° C., then 1 hr at 121° C. The adhered sheet material was subjected to four temperature cycles and then evaluated visually for shrinkage, cracks or debonding from the substrate.

Aging at 80° C.

A sample of multi-layer sheet material was adhered to aluminum panels as described under the chemical resistance tests above. Panels were placed in a forced air oven at 80° C. for seven days. Sheet materials were then observed for changes in appearance.

Brookfield Viscosity

Brookfield viscosity of raw materials and precursor mixtures of the films was measured at 23° C. according to DIN 53019. Results were recorded in mPa.s.

Measurement of Grind

Precursor mixtures of the films were evaluated for residual particles and degree of dispersion by performing a "grind" test according to DIN EN 21524 (ASTM D 1210) employing a test apparatus available as Model Grindometer (0–50 µm) from BYK-Gardner GmbH, 82534 Geretsried, Germany.

Materials Used in the Examples

Hydroxy-functional Polyester Resin

URALAC ZW 4196 SN (also available under the designation number XP 9461), 100% solids, hydroxy-functional polyester resin, acid value based on solid (mg KOH/g) of 8 12, hydroxy content of 7.1–7.7%, hydroxyl equivalent weight 232 g/mol, hydroxyl value (mg KOH/g) of 235–255, density 1,100 kg/m³; viscosity of 900–1,100 mPa.s, Tg=130° C., obtainable from DSM Resins B. V., 8000 AP Zwolle, The Netherlands.

TONE 230, bifunctional polyol based on caprolactone, hydroxy value (mg KOH/g) of 90, density 1,071 kg/mn³, Tg=40–50° C., molecular weight 1250. available from Union Carbide, USA.

Hydroxy-functional Acrylic Resin

URACRON ZW 3986 CY (also available under the designation number XP 4860 CY), 70% solids in butyl acetate, hydroxy acrylic resin, acid value based on solid (mg KOH/g) of 12–18, hydroxy content of 4.2%, hydroxyl equivalent weight 400 g/mol, density 1,090 kg/m³, viscosity of 3,000–7,000 mPa.s, Tg=48° C., available from DSM Resins B. V., 8000 AP Zwolle, The Netherlands.

JAGOTEX F 239, 50% solids in xylene/butyl acetate 1:1, hydroxy acrylic resin, acid value based on solid (mg KOH/g) of 8–12, hydroxy content of 2.0%, density 1,000 kg/m³, viscosity of 3500–5000 mPa.s, available from Ernst Jäger GmbH+CO. OHG Düsseldorf, Germany Molecular weight characterization of URALAC ZW 4196 SN and URACRON ZW 3986 CY was performed by conventional gel permeation chromatography (GPC). Samples (in THF at 0.25%; 100 µl) were run in THF at a temperature of 40° C. and a flow rate of 0.8 ml/min on 3×PL Gel mix E (from Polymer Laboratories, Heerlen, Netherlands), 300 by 7.5 nmm columns employing a differential refractive index detector (from Waters, Mass., USA) and polystyrene standards. The results are as follows:

|  | $M_n$ | $M_w$ | $M_z$ | $M_w/M_n$ |
| --- | --- | --- | --- | --- |
| URALAC 4196 | 877 | 1,429 | 2,042 | 1.63 |
| URACRON ZW 3986 | 2,389 | 4,470 | 7,025 | 1.87 |

Aminoplast Crosslinking Agent

CYMEL 1133, methoxymethyl butoxymethyl melamine, a methylated melamine-formaldehyde cross-linking agent with a high degree of alkylation, a low methylol content and low imino functionality, viscosity at 23° C. 750–1950 mPa.s, from Dyno Cytec, Lillestrom, Norway.

Other

CYCAT 4040, p-toluene sulfonic acid catalyst, available from Dyno Cytec, Lillestrom, Norway.

Dibasic esters (DBE), a mixture of dimethyl glutarate 50–70 wt. %, dimethyl succinate 19–30 wt. % and dimethyl adipate 10–25 wt. %, available from Sigma-Aldrich, Steinheim, Germany.

ISOVERSAL LM 00677, carbon black based black pigment paste (12 wt. % pigment in binder) available from ISL, Kuerten, Germany.

KRONOS 2310, powdered titanium dioxide based white pigment available from Kronos, International, Leverkusen, Germany.

DISPARLON L 1980, acrylate-based wetting agent available from Kusomoto, Japan

DESMODUR BL 3175 blocked polyfunctional diisocyanate, adduct of 1,6-hexamethylene dissocyanate and 2-butanone oxime, NCO content of 11,1%, density 1,060 kg/m³, viscosity 2500–4000 mPa.s, available from Bayer AG, Leverkusen, Germany Dibutyl tin dilaurate, catalyst, viscosity <500 mPa.s, density 1,250 kg/m³ available from Johnson Matthey GmbH, Karlsruhe, Germany.

FLUORAD FC 430, nonionic fluorochemical wetting agent available Minnesota, Mining ad Manufacturing Company, St. Paul, Minn., USA.

AEROSILE R 974, hydrophobic fumed silica available from the company Degussa AG, Frankfurt, Germany.

EXAMPLES

Example 1a

Preparation of Precursor Mixture for the Top Film

A hydroxy-functional acrylic resin (available as URACRON ZW 3986 CY from DSM Resins B. V., Zwolle, The Netherlands (39.5 wt. %)) was combined with a hydroxy-functional polyester resin (available as URALAC ZW 4196SN from DSM Resins B. V., Zwolle, The Netherlands (9.9 wt. %)), melamine cross-linking agent (methoxymethyl butoxymethyl melamine) (available as CYMEL 1133 from Dyno Cytec, Lillestrom, Norway (7.4 wt. %)), dibasic ester (a mixture of dimethyl glutarate 50–70 wt. %, dimethyl succinate 19–30 wt. % and dimethyl adipate 10–25 wt. % available from Sigma-Aldrich (29.6 wt %)), a catalyst (p-toluene sulfonic acid available as CYCAT 4040 from Dyno Cytec, Lillestrom, Norway (0.3 wt. %)), wetting agent (DISPARLON L 1980 available from Kusomoto, Japan (1.0 wt. %)) and a carbon black-based black pigment paste (12 wt. % pigment in binder) (available as ISOVERSAL LM 00677 from ISL, Kuerten, Germany (12.3 wt. %)) by mixing in a metal container with a high shear mixer for ca. one half hour so that the pigment was dispersed to give a grind of less than 10 μm as determined by the test method described above under "Measurement of grind".

The solids (non-volatiles) content of the precursor mixture was 50 percent and the Brookfield viscosity was 100 mPa.s. The precursor mixture was allowed to rest for 12 hours to permit air bubbles to escape.

The composition of the precursor mixture for the top film is summarized in Table 1.

Coating of the Precursor Mixture for the Top Film onto a Release Substrate

A release substrate comprising a polymer-coated paper was prepared by taking a 100 g HIFI Kraft paper Cham Tenero (from Cham Tenero AG, Cham Tenero, Switzerland) and coating it with a solution of acrylic release material. The paper was then dried to give a dry coating weight of ca. 13.7 g/m². The surface was smooth and glossy.

The precursor mixture prepared above was coated onto the release surface of the release substrate using reverse rotogravure coating to give a wet thickness of about 16 μm. The coating was cured by subjecting it to a series of increasing temperatures in a forced air oven. First the film was allowed to cure 1 minute at 23° C., followed by 2 minutes at 80° C., 1 minute at 140° C. and finally 2 minutes at 190° C. The final thickness of the cured top film was 10 μm.

Preparation of Precursor Mixture for the Base Film

A hydroxy-functional acrylic resin (available as URACRON ZW 3986 Cy from DSM Resins B. V., Zwolle, The Netherlands (38.7 wt. %)) was combined with a hydroxy-functional polyester resin (available as URALAC ZW 4196 SN from DSM Resins B. V., Zwolle, The Netherlands (16.6 wt. %)), melamine cross-linking agent (methoxymethyl butoxymethyl melamine) (available as CYMEL 1133 from Dyno Cytec, Lillestrom, Norway (12.6 wt. %)), dibasic esters (mixture of dimethyl glutarate 50–70 wt. %, dimethyl succinate 19–30 wt. % and dimethyl adipate 10–25 wt. % available from Sigma-Aldrich Chemie GmbH, Steinheim, Germany (2.1 wt %)), a catalyst (p-toluene sulfonic acid available as CYCAT 4040 from Dyno Cytec Lillestrom, Norway (0.3 wt. %)), wetting agent (DISPARLON L 1980 available from Kusomoto, Japan (0.3 wt. %)) and a powdered titanium dioxide based white pigment KRONOS 2310 (available from Kronos, International, Leverkusen, Germany (29.4 wt. %)) by mixing in a metal container with a high shear mixer for ca. one half hour so that the pigment was dispersed to give a grind of less than 30 μm (see Test Method above Measurement of Grind).

The formulation was allowed to rest for 12 hours to allow air bubbles to escape. The precursor mixture for the base film had a Brookfield viscosity of 1,300 mPa.s and a solids (non-volatiles) content of 86%.

The composition of the precursor mixture for the base film is summarized in Table 1.

Coating of the Precursor Mixture for the Base Film onto the Top Film/Release Substrate The white-pigmented precursor mixture just described was then coated onto the 10 μm black-pigmented top film, supported on the release substrate. The white precursor mixture for the base film was applied directly to the cured black top film using a knife coater. A coating was applied at a thickness of 130 μm and dried under the following conditions: 1 minute at 23° C., 4 minutes at 80° C., 2 minutes at 140° C. and finally 4 minutes at 190° C. The dry thickness of the base film was 100 μm.

Preparation of the Adhesive Layer

A layer of pressure-sensitive adhesive was prepared by coating a solvent-based acrylic pressure-sensitive adhesive on a siliconized paper release liner. The adhesive composition comprised a tackified copolymer of isooctyl acrylate (IOA) and acrylic acid (AA). The adhesive layer was dried in a force air oven to give a dry thickness of ca. 30 μm.

Preparation of the Completed Multi-layer Sheet Material

The adhesive/liner composite was then laminated to the two-layer film on the release substrate, prepared above. The adhesive surface was laminated to the white base film surface. Finally, the release substrate (on which the two-layer film was cast) was removed from the black top film, leaving a multi-layer sheet material covered with a release liner.

TABLE 1

Composition of precursor mixtures for the top and base films of Example 1a

| Example 1a Component | Top film precursor, wt % | Base film precursor, wt % |
|---|---|---|
| URACRON ZW 3986 | 39.5 | 38.7 |
| URALAC ZW 4196 | 9.9 | 16.6 |
| CYMEL 1133 | 7.4 | 12.6 |
| CYCAT | 0.3 | 0.3 |
| DISPERLON 1980 | 1.0 | 0.3 |
| ISOVERSAL LM00677 | 12.3 | 0 |
| KRONOS 2310 | 0 | 29.4 |
| Dibasic esters | 29.6 | 2.1 |
| Solids, % | 50 | 86 |
| Viscosity, mPa · s | 100 | 1,300 |

Example 1b

Example 1a was repeated with the exception that the base film had a final thickness of about 50 µm, i.e. about half that of Example 1a. The top film and adhesive layer, like the sheet material of Example 1a, had a final thickness of 10 and ca. 30 µm, respectively The sheet materials prepared in Examples 1a and 1b were subjected to the laser cutting test as described above. The results are shown in Table 4. Also under the same conditions, the laser cuttability of the following comparative examples was determined. The results of the comparative examples are also listed in Table 4.

Comparative Example 1

Example 1b was repeated with the exceptions that for the base film precursor DESMODUR was applied as the cross-linking agent instead of the aminoplast cross-linking agent CYMEL 1133A and dibutyl tin dilaurate was applied as the catalyst and added just prior to coating. The composition of the precursor mixtures for the top film and base film is summarized in Table 2. Like the sheet material of Example 1b, the base film had a final thickness of about 50 µm, while the top film and adhesive layer had a final thickness of 10 and ca. 30 µm, respectively.

TABLE 2

Composition of precursor mixtures for the top and base films of Comparative Example 1

| Comparative Example 1 Component | Top film precursor, wt % | Base film precursor*, wt % |
|---|---|---|
| URACRON ZW 3986 | 39.8 | 23.9 |
| URALAC ZW 4196 | 10.0 | 10.2 |
| DESMODUR BL 3175 | — | 37.0 |
| CYMEL 1133A | 7.5 | — |
| CYCAT | 0.25 | — |
| DISPERLON 1980 | 0.25 | 0.3 |
| ISOVERSAL LM 00677 | 12.4 | — |
| KRONOS 2310 | — | 28.6 |
| Dibasic esters | 29.8 | — |

*dibutyl tin dilaurate was applied as catalyst at a concentration of 0.09 wt % based on 100 kg of precursor mixture.

Comparative Example 2

A commercially available laser-markable label stock, TESA 6930 black on white (available from Beiersdorf AG, Hamburg, Germany), based on a radiation cross-linked polyurethane acrylate and comprising a 10 µm top film, 100 µm base film and ca. 30 µm thick pressure-sensitive adhesive layer.

Comparative Example 3

A commercially available laser-markable label stock, TESA 6930 black on white (available from Beiersdorf AG, Hamburg, Germany), based on a radiation cross-liked polyurethane acrylate and having a 10 µm top coat, 50 µm base layer and ca. 30 µm pressure-sensitive adhesive layer.

Comparative Example 4

A commercially available laser-markable label stock, Color Laser Film black/white—(available from Schreiner Etiketten und Selbstklebetechnik GmbH & Co., Oberschleißheim bei München, Germany), based on a polyester film having a thickness of 94 µm and ca. 30 µm thick pressure-sensitive adhesive layer.

Comparative Example 5

A label stock of the type disclosed in U.S. Pat. No. 5,688,573 employing precursor mixtures for the top and base as summarized in Table 3 was prepared according to the general procedure described in Example 1a, except that the catalyst was added just prior to coating. The final label stock comprised a 10 µm thick top film, a 50 µm thick base film and a 30 µm thick layer of pressure-sensitive adhesive.

TABLE 3

Composition of precursor mixtures for the top and base films of Comparative Example 5

| Comparative Example 5 Component | Top film precursor*, wt % | Base film precursor*, wt % |
|---|---|---|
| JAGOTEX F239 | 47.7 | 51.0 |
| TONE 230 | 8.4 | 9.0 |
| DESMODUR BL 3175 | 15.7 | 16.84 |
| ISOVERSAL LM00677 | 18.4 | 0 |
| KRONOS 2310 | 0 | 14.1 |
| FLUORAD FC430 (50% in Xylene) | 0 | 0.14 |
| Xylene | 8.4 | 8.92 |
| Aerosil R 974 | 1.4 | 0 |

*dibutyl tin dilaurate was applied as catalyst at a concentration of 0.09 wt % based on 100 kg of precursor mixture.

TABLE 4

Results of laser cuttability testing

| Example | Thickness of base film, µm | Laser cutting speed, mm/sec | Laser cutting speed, mm/sec (1.8 mm mode blend) |
|---|---|---|---|
| 1a | 100 | 360 | 210 |
| 1b | 50 | 380 | 320 |
| C1 | 50 | 90 | 80 |
| C2 (Tesa thick) | 100 | 220 | 210 |
| C3 (Tesa thin) | 50 | 300 | 250 |
| C4 (Schreiner) | 94 | * | 25 |
| C5 (US 5,688,573) | 50 | 220 | 200 |

*film melted, not laser-cuttable

Example 2

A sheet material was prepared according to the procedure described for Example 1a, with the exception that the top film was coated onto the removable support using a knife coater, employing precursor mixtures for the top and base films as summarized in Table 5.

TABLE 5

Composition of precursor mixtures for the top and base films of Example 2

| Example 2 Component | Top film precursor, wt % | Base film precursor, wt % |
|---|---|---|
| URACRON ZW 3986 | 50.4 | 48.7 |
| URALAC ZW 4196 | 12.6 | 8.1 |
| CYMEL 1133 | 9.5 | 12.2 |
| CYCAT | 0.3 | 0.3 |
| DISPERLON 1980 | 0.2 | 0.3 |
| ISOVERSAL LM00677 | 15.7 | 0 |
| KRONOS 2310 | 0 | 28.4 |
| Dibasic esters | 11.3 | 2.0 |
| Solids, % | 64 | 83 |
| Viscosity, mPa · s | 250 | 1,400 |

The sheet materials prepared in Examples 1a and 2 as well as the label stocks of Comparative Examples 2 and 5 were subjected to the durability and tamper resistance/destructibility tests described above. The results are listed in Table 6.

TABLE 6

Results of durability and tamper resistance/destructibility testing

| Test | Laser Marked | Example 1a | Example 2 | Comp. Ex. 2 | Comp. Ex. 5 |
|---|---|---|---|---|---|
| Initial Adhesion (AI), N/cm | no | destructible | destructible | 3.7 N/cm | 6.1 N/cm |
| Immersion in ASTM Oil 2 | yes | no change destructible | no change destructible | no change destructible | no change 7.9 N/cm* |
| Immersion in Water | yes | no change destructible | no change destructible | no change destructible | no change destructible |
| Immersion in Caustic Soda | yes | no change destructible | no change destructible | no change destructible | no change destructible |
| Immersion in Sulfuric Acid | yes | no change destructible | no change destructible | no change destructible | No change destructible |
| Immersion in Toluene | yes | no change destructible | no change destructible | no change destructible | material was damaged |
| Immersion in Diesel Fuel | yes | no change 8.4 N/cm | no change destructible | no change 2.7 N/cm* | no change 6.5 N/cm* |
| Humidity Resistance | yes | no change destructible | no change destructible | no change destructible | no change 6.2 N/cm* |
| Thermal Cycling | no | no change destructible | no change destructible | no change destructible | no change |
| Aging at 80° C. | no | no change destructible | crack in top film, destructible | no change destructible | no change destructible |
| Shrinkage at −25° C., % | yes | 1.6% | no shrink | no shrink | <1% |
| Shrinkage at 100° C., % | yes | 0.4% | crack in top film | 0.2% | <1% |
| Abrasion Resistance | yes | no abrasion | no abrasion | no abrasion | no abrasion |

*could be removed intact without damage

Examples 1a-Film, 1b-Film, 2-Film and 3–7

Because thicker base films typically contribute most of the thickness of a multi-layer sheet material and account largely for its handling properties, base films were prepared alone, i.e. as self-supporting films without any adhesive layer or top film, and tested alone for their tensile and elongation properties.

The preparation of the base films of Examples 1a, 1b and 2 was repeated except that the respective precursor mixtures were coated directly onto a removable support and after curing the removable support was removed to give white-pigmented, self-supporting films of ca. 100, 50 and 100 μm thickness, respectively. These preparative Examples are denoted as "1a-thick-film", "1b-thin-film" and "2-film"

In Examples 3 through 7 varying amounts of acrylic and polyester components URACRON ZW 3986 CY and URALAC ZW 4196 SN) were combined with melamine cross-linker (CYMEL 1133), coated on a removable support and cured in a similar manner to provide white-pigmented, self-supporting films having a thickness of ca. 100 μm.

The compositions as well as the viscosity and percent solids content of the precursor mixtures for the films are recorded in Table 7.

TABLE 7

Composition of precursor mixtures

| Example | HO-Acrylate, wt. % | HO-Polyester wt. % | X-linker, wt. % | DBE, wt. % | Cat, Wt. % | Wetting agent, wt. % | White Pigment, wt. % | Solids, % | Visc., mPa · s |
|---|---|---|---|---|---|---|---|---|---|
| 1a-thick-film and 1b-thin-film | 38.7 | 16.6 | 12.6 | 2.1 | 0.3 | 0.3 | 29.4 | 86 | 1,300 |
| 2-film | 48.7 | 8.1 | 12.2 | 2.0 | 0.3 | 0.3 | 28.4 | 83 | 1,400 |
| 3 | 46.4 | 10.1 | 12.3 | 2.1 | 0.3 | 0.3 | 28.6 | 83 | — |
| 4 | 34.8 | 16.2 | 12.1 | 4.0 | 0.2 | 0.2 | 32.4 | 85 | 1,100 |
| 5 | 28.7 | 25.0 | 13.1 | 2.2 | 0.3 | 0.3 | 30.4 | 89 | — |
| 6 | 42.6 | 13.3 | 12.5 | 2.1 | 0.3 | 0.3 | 29.0 | 85 | — |
| 7 | 42.7 | 14.2 | 10.7 | 3.6 | 0.2 | 0.2 | 28.5 | 83 | — |

For clarity and comparative purposes, the composition of the polymer-forming components of the precursor mixtures is also presented in a form where the sum of the hydroxy-functional acrylic resin component, the hydroxy-functional polyester component the melamine cross-linking agent is equal to 100%. These figures are based on 100% ids and are summarized in Table 8.

TABLE 8

Percentages of weight based on total weight of resin solids in precursor mixtures

| Example | Hydroxy-acrylate, wt. % | Hydroxy-polyester, wt. % | Cross-linking agent, wt. % |
|---|---|---|---|
| 1a and 1b | 48.1 | 29.5 | 22.4 |
| 2 | 62.7 | 14.9 | 22.3 |
| 3 | 59.2 | 18.4 | 22.4 |
| 4 | 46.2 | 30.8 | 23.0 |
| 5 | 34.5 | 43.0 | 22.5 |
| 6 | 53.6 | 23.9 | 22.5 |
| 7 | 54.6 | 25.9 | 19.5 |

E-modulus, tensile strength and elongation at break of the films were measured according to the method described tinder Test Methods and the results summarized in Table 9. The label stocks of Comparative Examples 2, 3 and 5 were also tested and the results are also listed in Table 9. It should be noted that these comparative examples were tested only in a multi-layer form, i.e. base film together with an adhesive layer and a thin top film.

TABLE 9

Results of E-modulus, tensile strength and elongation at break measurements

| Example | Film or base film thickness, μm | E-modulus, N/mm² | Tensile strength at break, N/cm² | Elongation at break, % |
|---|---|---|---|---|
| 1a-thick-film | 100 | 437 | 2276 | 7.7 |
| 1b-thin-film | 50 | 535 | 2346 | 2.2 |
| C2(BDF thick) ** | 100 | 674 | 3622 | 4.4 |
| C3 (BDF thin) ** | 50 | 1,262 | 6331 | 3.2 |
| C5 (US 5,688,573) ** | 50 | 882 | 5567 | 7.2 |
| 2-film | 100 | NT | 2953 | 2 |
| 3 | 100 | NT | 2795 | 2.7 |
| 4 | 100 | NT | 1496 | 25 |
| 5 | 100 | 35 | 670 | 14 |
| 6 | 100 | 1,190 | 2007 | 1.8 |
| 7 | 100 | NT | 3031 | 5 |

NT = Not tested
** Measurements were made on complete label stock comprising base film with pressure-sensitive adhesive layer and a thin top film.

What is claimed is:

1. A halogen-free multi-layer sheet material comprising:
   (i) a pigmented base film of a polymer consisting essentially of the reaction product of a precursor mixture comprising a first hydroxy-functional resin, a second hydroxy-functional resin and an aminoplast cross-linking agent and a first pigment;
   (ii) a pigmented top film adjacent to a surface of the base film, the top film of a polymer selected from the group consisting of polyurethane, polycarbonate, and a polymer comprising the reaction product of a precursor mixture comprising a first hydroxy-functional resin, a second hydroxy-functional resin and an aminoplast cross-linking agent, and a second pigment;
   (iii) an adhesive layer adjacent to another surface of the base film; and
   (iv) optionally, a release liner on the adhesive layer, wherein the first pigment and the second pigment are contrasting colors.

2. A multi-layer sheet material according to claim 1, wherein the precursor mixture of the base film polymer and/or the top film polymer further comprises a catalyst, a solvent, and/or a wetting additive.

3. A multi-layer sheet material according to claim 1, wherein the base film has a tensile strength at break of about 1300 to about 3500 N/cm².

4. The multilayer sheet material of claim 1, wherein the base film and the top film are of the same polymer.

5. The multilayer sheet material of claim 1, wherein the first and second pigments are selected from pigments comprising carbon black or titanium dioxide.

* * * * *

UNITED STATES PATENT AND TRADEMARK OFFICE
CERTIFICATE OF CORRECTION

PATENT NO. : 6,824,849 B2
DATED : November 30, 2004
INVENTOR(S) : Herzog, Silke

It is certified that error appears in the above-identified patent and that said Letters Patent is hereby corrected as shown below:

Column 7,
Line 33, delete "pentaerythlitol" and insert -- pentaerythritol --.
Line 42, delete "hexahydroplithalic" and insert -- hexahydrophthalic --.
Line 54, delete "polytetrametlhylene" and insert -- polytetramethylene --.

Column 11,
Line 13, delete "life" and insert -- knife --.

Column 12,
Line 51, delete "Organ" and insert -- Organo --.

Column 15,
Line 63, after "kg/m$^3$" delete ";" and insert -- , --.
Line 67, delete "kg/mn$^3$" and insert -- kg/m$^3$ --.

Column 16,
Line 23, after "7.5" delete "nmm" and insert -- mm --.

Column 17,
Line 59, delete "Cy from" and insert -- Cyfrom --.

Column 19,
Line 59, delete "cross-liked" and insert -- cross-linked --.

Column 22,
Line 19, after "components" insert -- ( --.

UNITED STATES PATENT AND TRADEMARK OFFICE
CERTIFICATE OF CORRECTION

PATENT NO. : 6,824,849 B2
DATED : November 30, 2004
INVENTOR(S) : Herzog, Silke

It is certified that error appears in the above-identified patent and that said Letters Patent is hereby corrected as shown below:

<u>Column 23,</u>
Line 23, after "component" insert -- and --.
Line 24, delete "ids" and insert -- solids --.
Line 43, delete "tinder" and insert -- under --.

Signed and Sealed this

Twenty-third Day of May, 2006

JON W. DUDAS
*Director of the United States Patent and Trademark Office*